Sept. 15, 1959
D. CURRIE
2,903,834
TRACTOR CORN PICKER ATTACHMENT
Filed Oct. 2, 1956
4 Sheets-Sheet 1
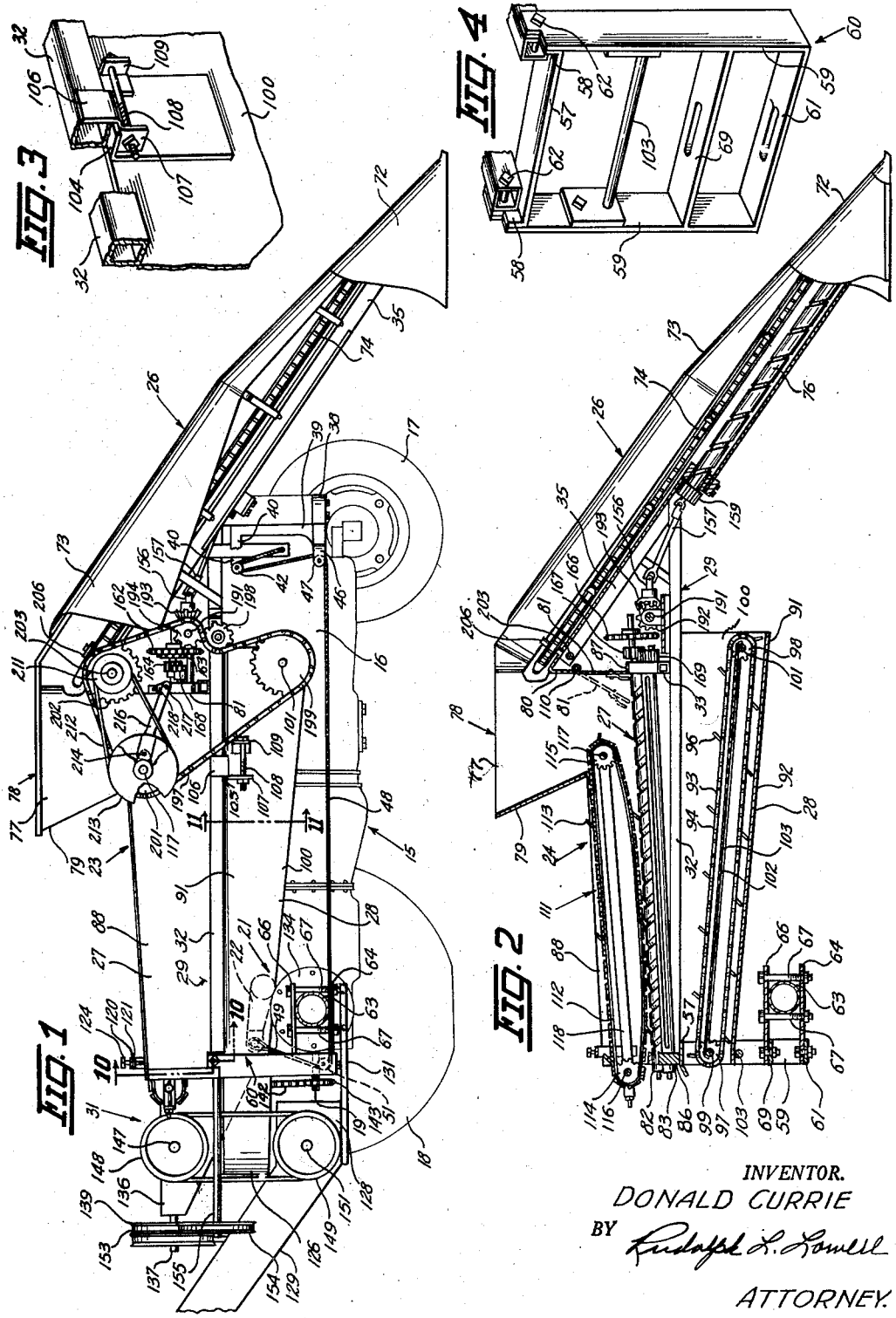
INVENTOR.
DONALD CURRIE
BY Rudolph L. Lowell
ATTORNEY.

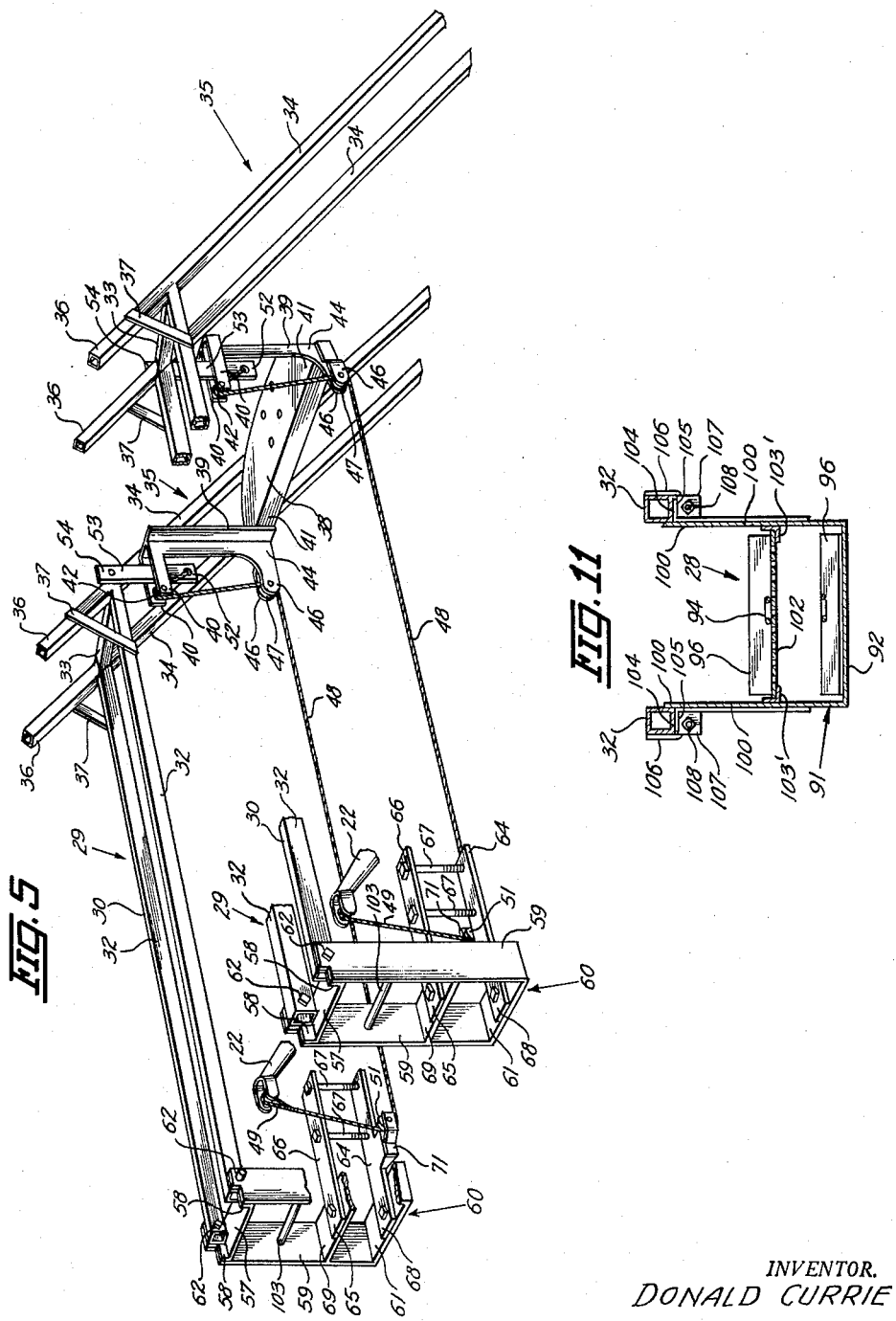

Sept. 15, 1959    D. CURRIE    2,903,834
TRACTOR CORN PICKER ATTACHMENT
Filed Oct. 2, 1956    4 Sheets-Sheet 3
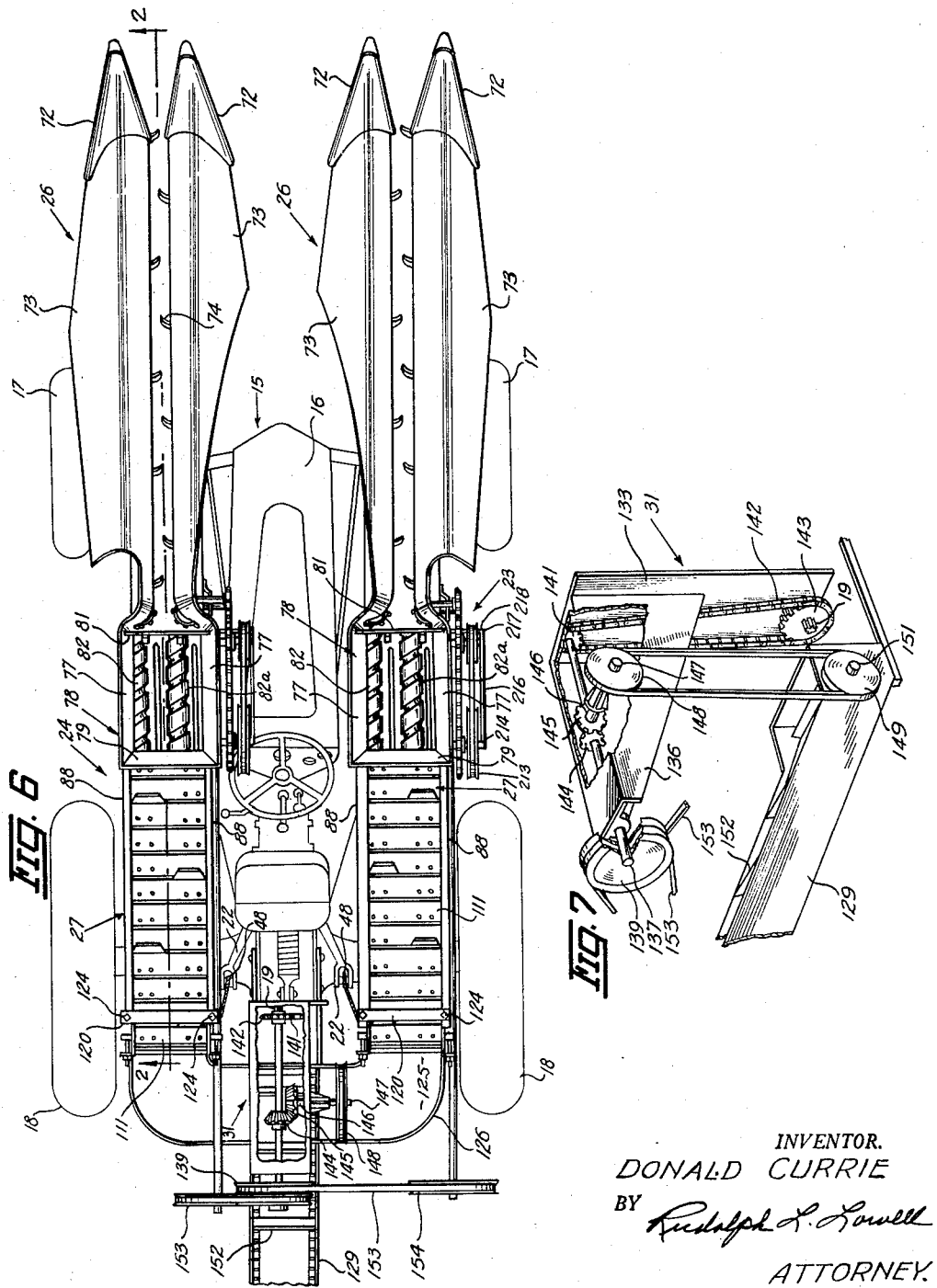
INVENTOR.
DONALD CURRIE
BY
*Rudolph L. Lowell*
ATTORNEY.

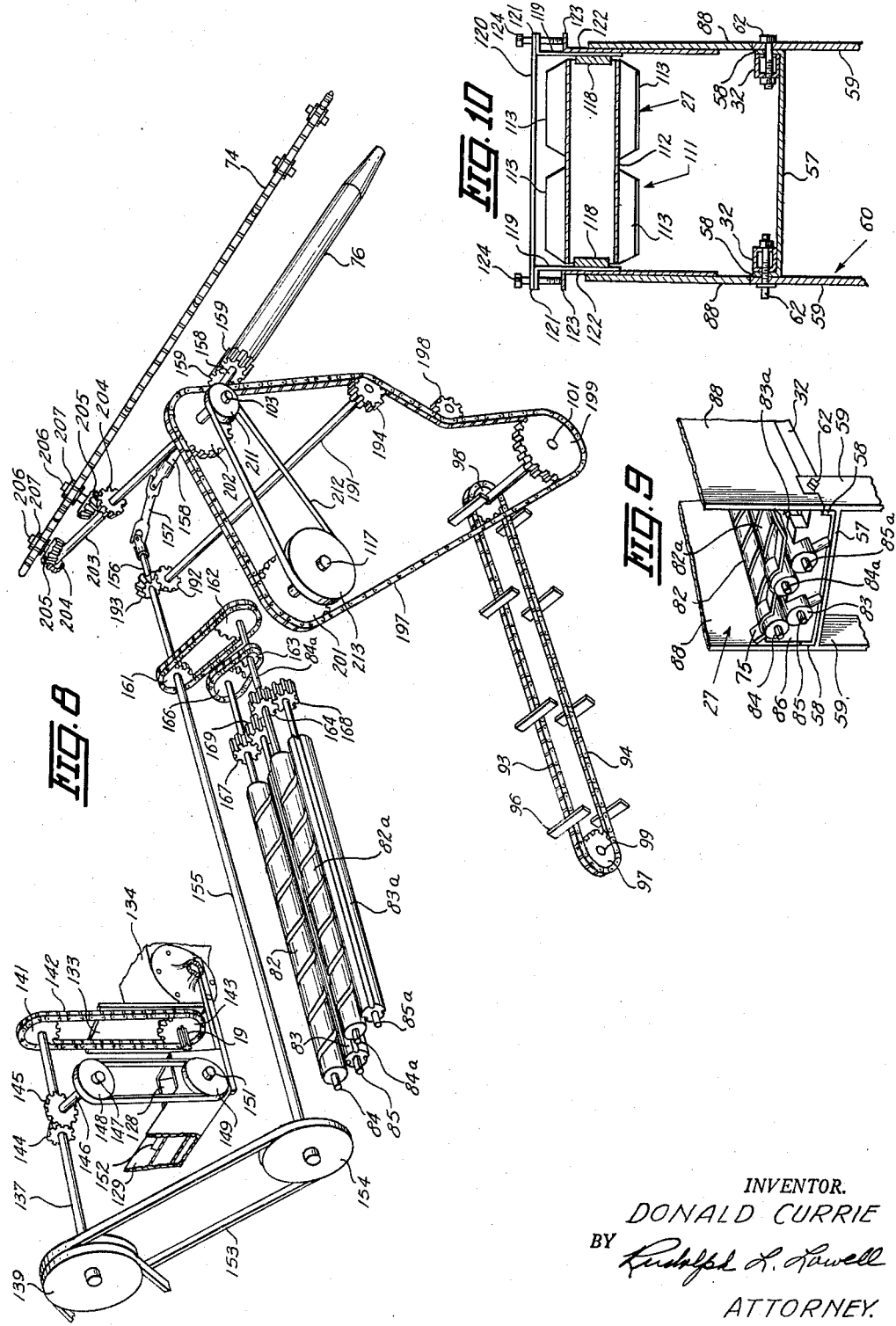

United States Patent Office 2,903,834
Patented Sept. 15, 1959

2,903,834

TRACTOR CORN PICKER ATTACHMENT

Donald Currie, Odebolt, Iowa

Application October 2, 1956, Serial No. 613,405

4 Claims. (Cl. 56—18)

This invention relates generally to corn picking machines and in particular to a two row corn picker attachment for a tractor.

It is an object of this invention, therefore, to provide an improved corn picker attachment for a farm tractor.

A further object of this invention is to provide a two row corn picker attachment for a farm tractor wherein the over all assembly has the advantages of a self propelled corn picker, in the ease of tractor maneuverability.

A further object of this invention is to provide a two row corn picker attachment for a farm tractor in which a pair of similar assemblies, positioned along opposite sides of the tractor, are capable of being simultaneously operated and controlled from a common power unit on a farm tractor.

Still another object of this invention is to provide a corn picker attachment which is adapted to be readily removed from and assembled with a farm tractor in a comparatively short period of time.

Yet a further object of this invention is to provide a corn picker attachment wherein any shelled corn is continuously separated from the corn husks and delivered into a wagon elevator concurrently with the corn ears.

Another object of this invention is to provide a corn picker attachment for a farm tractor in which the corn ears are positively moved along husker rolls to eliminate any piling up of corn as it travels through the attachment from the gathering rolls to the wagon elevator.

Still a further object of this invention is to provide a corn picker attachment for a farm tractor wherein a main frame is supported on the tractor such that the gathering unit of the attachment is capable of being raised and lowered a comparatively great distance by a usual power lift means provided on the tractor.

Another object of this invention is to provide a two row corn picker attachment for a farm tractor which is of a compact and rugged construction, adapted to be mounted on a tractor without obscuring the vision of the tractor operator, or interfering with the manipulation of the tractor, and efficient in operation to pick corn of varying sizes.

Further objects, features and advantages of this invention will become apparent from the following description when taken in connection with the accompanying drawing in which:

Fig. 1 is a side elevational view of the two row corn picker attachment of this invention shown in assembly relation with a farm tractor, with parts of the tractor being removed for the purpose of clarity;

Fig. 2 is a longitudinal sectional view, through one of the assemblies of the two row corn picker attachment of this invention, removed from the tractor, as seen on line 2—2 in Fig. 6;

Fig. 3 is an elarged detail perspective view of a part of the mounting means for a shelled corn and husk separator unit which forms a part of the corn picker attachment of this invention, parts being broken away and shown in section for the purpose of clarity;

Fig. 4 is an enlarged detail perspective view of a tractor mounting bracket for the corn picker attachment of this invention;

Fig. 5 is a perspective view of the main frames of a pair of corn picker assemblies, forming the attachment of this invention, shown in assembly relation with a tractor power lift and tractor mounting brackets for the assemblies;

Fig. 6 is a plan view of the tractor and corn picker attachment assembly shown in Fig. 1, with parts being broken away for the purpose of clarity;

Fig. 7 is an enlarged perspective view of the power transmitting mechanism for driving the attachment of this invention from the tractor rear end power take off, with parts broken away for the purpose of clarity;

Fig. 8 is a diagrammatic perspective view of the power transmission system for one of the assemblies of the two row corn picker attachment of this invention;

Fig. 9 is a detail perspective view of the rear end portion of the husking unit which forms a part of the attachment of this invention;

Fig. 10 is an enlarged sectional view looking substantially along the line 10—10 in Fig. 1; and Fig. 11 is an enlarged sectional view as seen on line 11—11 in Fig. 1.

With reference to the drawing, the corn picker attachment of this invention is shown in Fig. 1 in assembly relation with a usual type farm tractor, indicated generally at 15 and having a main frame 16, front wheels 17, rear wheels 18, a rear power take off 19 and a rear power lift mechanism, designated generally at 21 and including a pair of lift arms 22 (Fig. 6).

The corn picker attachment is comprised of a pair of like assemblies 23 and 24 (Figs. 1 and 6), extended longitudinally of and arranged along opposite sides of the tractor 15. Each assembly 23 and 24 includes a corn gathering and snapping unit 26, a husking unit 27 and a combination shelled corn and husk separating unit 28 mounted in operative association on a frame structure 29 (Figs. 2 and 5), so as to be driven from a power transmitting mechanism 31 (Figs. 1, 6 and 7) connected with the tractor power take off 19.

Since the assemblies 23 and 24 are of a like construction and similar in operation only the assembly 23 will be described in detail and corresponding parts in the assemblies 23 and 24 will be designated by like numerals.

As best appears in Fig. 5, the frame structure 29 for the corn picker assembly 23 includes a horizontal section 30 that is formed of a pair of transversely spaced longitudinally extended tubular side members 32 the front ends of which are connected to each other by a connecting end member 33. A front section 35 of the frame structure 29 is inclined downwardly and forwardly from the side members 32 of the horizontal frame section and comprises a pair of transversely spaced tubular side members 34, the upper ends 36 of which extend above the horizontal section 30 and are suitably connected with the side frame members 32 by brace members 37.

The frame structure 29 is mounted on the tractor 15 by means including a front mounting plate 38 (Figs. 1 and 5), which extends transversely of and is suitably secured to the underside of the front end of the tractor frame 16. The front mounting plate 38 (Fig. 5) carries an upright leg 39 at each of its ends 41, and with the legs 39, in a tractor supported position of the plate 38, being arranged at opposite sides of the tractor as best appears in Fig. 1. The upper end of a leg 39 is provided with a pair of rearwardly extended transversely spaced combination guide and support members 40, the rear ends of which rotatably support a cable pulley 42. The lower end 44 of a leg 39 is similarly provided with rearwardly extended supports 46 for rotatably supporting a cable pulley 47.

A lifting cable 48 (Fig. 5) extended generally longitudinally of the tractor 15, is connected at one end 49 with a lift arm 22 of the power lift mechanism 21, from which it is extended about a pulley 51 and then about the pulleys 47 and 42 for connection of its opposite end 52 to the lower end of an arm member 53 which is guidably movable between the guide members 40 on the leg 39 at a position forwardly of the pulley 42. The upper end 54 of the arm member 53 is secured to the frame structure 29 at the junction of the horizontal frame section 30 with the inclined frame section 35.

The rear end of the frame structure 29 rests upon and is rigidly secured to a pivoted plate member 57 (Figs. 4 and 5) formed with upturned bearing supports 58. The plate 57 is extended between the upper ends of the leg members 59 of a U-shape rear mounting bracket 60 having a base section 61 integrally formed with the leg members 59. Pivot bolts 62 extended through the upper ends of the leg members 59, the bearing supports 58 and the side members 32 of the frame structure 29 pivotally support the rear end of the structure 29 for pivotal movement of the frame structure 29 about a transversely extended horizontal axis.

The bracket 60 (Figs. 1, 2 and 5) is supported from the tractor rear axle 63 at a position rearwardly thereof by means including a pair of forwardly extended vertically spaced lower and upper mounting straps 64 and 66, respectively, which receive the tractor rear axle 63 in a straddling relation and are secured thereto in a usual manner by clamping bolts 67. The rear end 68 of the lower mounting strap 64 is secured to the base member 61 of the mounting bracket 60, and the rear end 65 of the upper strap member 66 is secured to a plate member 69 extended between and connected to the leg members 59 at a vertically spaced position above the base member 61. The cable pulley 51 is rotatably carried on a bearing support 71 provided on the lower strap member 64.

Thus with the front mounting plate 38 and the rear mounting brackets 60 supported on the tractor 15 (Figs. 1 and 5) it is seen that on upward movement of the lift arms 22 for the power lift mechanism 21, that the arm members 53 are moved upwardly in a guided relation between the guide members 40, to in turn provide for an upward pivotal movement of the frame structure 29 about their pivotal supports 62 at the upper ends of the rear mounting brackets 60. Conversely, on a downward pivotal movement of the lift arms 22 the arm members 53 are moved downwardly between the guides 40 by the action of gravity, for a purpose to be later explained.

Each corn gathering and snapping unit 26 (Figs. 1 and 2) is supported on a corresponding inclined section 35 of a frame structure 29. A gathering unit 26 is of a generally usual type and includes a pair of transversely spaced snout members 72 and a housing 73 for the usual corn gathering chains 74 which are operatively associated with combination gathering and snapping rollers 76. It is seen, therefore, that a corn gathering unit 26 is inclined downwardly and forwardly of the tractor 15 and extends upwardly over the full length of the inclined section 35 of a frame structure 29. The upper ends of the housing or casing members 73 terminate in, and are constructed to form the side walls 77 (Figs. 2 and 6) of a corn receiving hopper 78 having a rear wall 79 and a front wall 80 which terminates at a level below the upper ends of the gathering chains 74. The front wall 80 has a pivotally supported lower section 81 for a purpose to appear later.

The hopper 78 is located over the front end of the husker unit 27 which is carried on and extends longitudinally over the full length of the horizontal section 30 of the frame structure 29 (Fig. 2). The husker unit 27 comprises a series of four husking rolls 82 and 82a and 83 and 83a (Figs. 2 and 8) having shafts 84, 84a, 85 and 85a, respectively. The rear ends of the shafts 84, 84a, 85 and 85a are rotatably carried in a bearing plate 86 (Figs. 2 and 9) which is secured to the pivoted plate 57 at a position rearwardly of the rear ends of the side members 32 of the horizontal frame section 30. As shown in Figs. 8 and 9, the rolls 82 and 82a are arranged above their associated rolls 83 and 83a, which rolls 82 and 82a are spring supported on the bearing plate 86 by means of a spring steel member 75 secured at each end to a side wall 88, for yieldable movement toward and away from the rolls 83 and 83a in response to the passage of corn husks therebetween. The front ends of the husker roller shafts 84, 84a, 85 and 85a are supported in a bearing plate 87 mounted on the side frame members 32 at a position forwardly of the front wall 80 of the corn receiving hopper 78.

Arranged at opposite sides of the husking rolls 82, 82a, 83 and 83a (Figs. 6 and 9) and extended between the bearings 86 and 87 for such rolls, are side walls 88 for confining the corn to be husked for travel rearwardly on the husking rolls. It is to be noted that the front bearing plate 87 for the husking rolls is at a higher elevation than the rear bearing plate 86, so that the husking rolls are inclined downwardly and rearwardly from the front bearing plate 87. Further, it will be seen that the husking rolls 82, 82a, 83 and 83a are of an appreciable length, and have their rear ends terminating at positions rearwardly of the tractor rear axle 63.

The combination shelled corn and husk separating unit 28 is located below the husking mechanism 24 and includes a housing or casing 91 of a substantially U-shape in transverse cross section (Figs. 2 and 11) having the base or bottom wall 92 thereof inclined or sloped in a downwardly and forwardly direction. Extended longitudinally of the housing 91 in a substantially parallel spaced relation with the base member 92 is a conveyor 93 comprised of a chain 94 to which are secured a series of spaced slat members 96. The chain 94 is operatively associated with gear members 97 and 98, with the gear 97 being rotatably supported on a shaft 99 carried in the legs or side walls 100 of the housing 91, and the gear 98 on a shaft 101 that is rotatably supported on the side walls 100, so that the gear 98 constitutes the drive gear for the conveyor 93.

Positioned below the top length of the chain 94 and extended longitudinally of the housing 91 is a screen or perforated apron member 102 (Figs. 2 and 11), extended between the sprocket shafts 99 and 101 and having the sides thereof supported on angle irons 103 secured to the inner sides of the leg members 100.

The housing 91 has the rear end thereof directly supported on a rod 103 (Figs. 2 and 4) connected to and extending between, the legs 59 of the rear mounting bracket 60 at a position intermediate the fixed plate member 69 and the pivoted plate member 57. Adjacent its front end the housing 91 is provided on each of its side walls 100 (Figs. 1, 3 and 11) with a laterally extended flat support 104 which is insertable between the lower side of a tubular side member 32 and the top side of a shelf 105 formed as part of a bracket 106 that is secured to a tubular side member 32. The shelf 105 has a depending end portion 107 for insertion therethrough of a bolt 108 which is also extended through a holding clip 109 on the side wall 100. With the support 104 resting on the shelf 105, extension of the bolt 108 through the depending portion 107 and clip 109 holds the housing against longitudinal movement out of a supported position on the shelf 105, and rod 103.

In assembly, therefore, the rear end of the housing 91 is initially placed on the rod 103, and the housing is then manipulated to provide for the mounting of the supports 104 on the shelves 105. The bolts 108 are then inserted for connecting together the depending portions 107 and the clip members 109.

In use, and with the corn gathering units 26 in their lowered operative positions shown in Fig. 1, the tractor is advanced between two rows of corn to provide for the stalks of corn entering between each pair of spouts 72. As the stalks pass between the combination gathering and snapping rolls 76, the removed corn ears are carried by the gathering chains 74 for discharge into the corn receiving hopper 78, the lower end of which is open to the front ends of the husking rolls 82, 82a, 83 and 83a. To prevent any collecting of corn at the front end of the husking rolls the movable front wall section 81, which is pivotally supported at 110 (Fig. 2) from the hopper front wall 81 is oscillated or swung back and forth to effect a bumping action on the corn so as to continuously direct the corn in a rearward direction along the husking rolls.

It will be noted that this rearward feeding of the corn ears rearwardly along the husking rolls 82, 82a, 83 and 83a is further complemented by virtue of the downward and rearward inclination of the husking rolls. In order to further assure a positive and continuous feeding of the corn ears rearwardly through the husking unit 24, there is provided a corn feeding structure 111 which includes a belt 112 of a flexible flat construction provided along its length with a series of spaced flexible fingers 113 (Fig. 2). The belt 112 is supported on sprockets 114 and 115 having shafts 116 and 117, respectively. The shaft 116 is rotatably supported between the rear ends of a pair of supporting bars 118 (Figs. 2 and 10) and the shaft 117 is extended through the front ends of the bars 118 and the side walls 88 of the husking unit 23 to provide for an adjustable up and down pivotal movement of the supporting bars 118 and in turn of the feeding structure 111 about the shaft 117.

As best appears in Fig. 10 the supporting bars 118 are positioned inwardly of the walls 88 of the husking unit 23 and are provided adjacent their rear ends with upright guide members 119 which are connected together across their upper ends by a brace member 120 to form laterally extended end shoulders 121. In turn, the side walls 88 have secured to the inner sides thereof cooperating upright guide members 122 the upper ends of which terminate in shoulders 123 that are located below the corresponding shoulders 121 of the connecting member 120.

Adjusting screws 124 are threadable through the shoulders 121 for abutment of their lower ends against the shoulders 123 to provide for an up and down pivotal adjustment of the feeding structure 111 relative to the husking rolls 82, 82a, 83 and 83a. By virtue of this adjustment, the clearance of the belt 112 relative to the husking rolls can be adjusted to provide for a desired pressure or action of the belt 112 and fingers 113 on the corn ears to be moved along the husking rolls.

The husks removed from the corn ears, drop downwardly from between the husking rolls 82, 82a, 83 and 83a onto the perforated apron 102 of the separating unit 28. These husks are moved forwardly and downwardly along the apron 102 by the conveyor 93 for discharge to the ground from the forward end of the separating unit 28.

Any corn that is shelled by the husking rolls 82, 82a, 83 and 83a also drops onto the perforated apron 102 for passing therethrough onto the base or bottom wall 92 of the separating unit 28. This shelled corn on the bottom wall 92 is moved by the slat members 96 of the conveyor 93 for discharge from the rear end of the separating unit 28, at a position immediately below the discharge of corn ears from the husking unit 24.

The shelled corn and the ear corn discharged from each assembly 23 and 24 drops into the inlet 125 of a chute 126 (Figs. 1 and 6) the outlet end of which is open to the boot 128 of a wagon elevator 129 that is mounted, in a usual manner, on the tractor draw bar 131.

It is seen, therefore, that the corn ears and the shelled corn are gathered together for discharge into the wagon elevator 129, and that the removed husks are discharged to the ground at a position between the front and rear wheels of the tractor 15.

In road travel of the tractor and corn picker attachment, namely, in travel between operating locations, the corn gathering units 26 are lifted in a clearance relation with the ground by actuation of the power lift 21 to move the lift arms 22 upwardly. In response to this upward movement of the lift arms 22 the cables 48 are actuated to in turn provide for an upward movement of the arm members 53, whereby the front ends of the assemblies 23 and 24 are pivoted upwardly about the pivots 62. In one embodiment of the invention this lifting movement results in a ground clearance of about twenty inches for the snouts 72.

Concurrent operation of the assemblies 23 and 24 is accomplished by utilization of the tractor rear power take off 19 by means including the power transmission mechanism 31 (Figs. 7 and 8). The mechanism 31 comprises an upright supporting plate 133, suitably secured to the tractor transmission housing 134, and having rearwardly extended from its upper portion a housing or hold 136. Extended longitudinally of the hood 136, and rotatably supported thereon is a driven shaft 137 projected outwardly from the rear end of the hood 136 for the mounting thereon of a double V-belt pulley 139. A sprocket gear 141 mounted on the forward end of the shaft 137 is connected through a sprocket chain 142 with a sprocket gear 143 mounted on the tractor power take off 19. Intermediate the ends of the driven shaft 137 is a bevel gear 144 that is in meshing engagement with a bevel gear 145 mounted on a stub shaft 146 rotatably carried in the hood 136. The projected end 147 of the stub shaft 146 has a pulley belt 148 connected with a pulley 149 on a drive shaft 151 for the conveyor 152 of the wagon elevator 129.

From each of the pulleys of the double pulley 139 a belt 153 is extended about a corresponding pulley 154 mounted on a driven shaft 155 extended longitudinally of a corresponding assembly 23 and 24. A shaft 155 extends substantially over the full length of the horizontal section 30 of an assembly frame structure 29 and is rotatably supported in bearings (not shown) from the tubular side members 32. Referring to Figs. 1 and 8, the front end 156 of the shaft 155 is connected through a universal joint connection 157 with a shaft 158 for one of the gathering rolls 76. As is usual, the rear or upper ends of the gathering rolls 76 are provided with meshing gears 159 to provide for the driving of one of the gathering rolls by the other.

The husking rolls 82, 82a, 83 and 83a are driven from the shaft 155 through a gear 161 mounted on the shaft 155 and chain connected with a gear 162 mounted on the shaft 84a for the husking roll 82a. Shaft 84a also carries gears 163 and 164 carried in that order rearwardly from the gear 162. The gear 163 is chain connected with a gear 166 carried at the front end of the shaft 84 for the husking roll 82, which shaft 84 also carries a gear 167. The gears 164 and 167 are in meshing engagement with gears 168 and 169, respectively, carried on the shafts 85a and 85 for the husking rolls 83a and 83, all respectively.

The conveyor 93, gathering chains 74, belt 112 and the movable wall portion 81 of the corn receiving hopper 78 are operated from the driven shaft 155 through a jack shaft 191 extended transversely of the shaft 155 at a position between the gear 161 and the universal connection 157 so as to be located forwardly of the husker unit 23 (Figs. 1 and 8), and the rear end of the gathering unit 26. The shaft 191 carries a bevel gear 192 at one of its ends for meshing engagement with a bevel gear 193 on the driven shaft 155. The opposite end of the shaft 191 has a sprocket gear 194 which forms part of a gear train, that is connected together by a sprocket chain 197. This gear train includes an idler or chain tightening gear 198, a gear 199 mounted on the shaft 101 of the conveyor 93, a gear 201 mounted on the shaft 117 for driving the belt 112, and a gear 202 mounted on a shaft 203 which is rotatably supported from the bottom side of the upper end of the corn gathering unit 26.

This shaft 203 carries a pair of axially spaced bevel gears 204 which are in meshing engagement with corresponding bevel gears 205 mounted on stub shafts 206, having sprocket gears 207 for driving the gathering chains 74. For the purpose of clarity, the belt 212, which is operated from the shaft 117, is not diagrammatically illustrated in Fig. 8, but this driving connection is apparent from a consideration of Figs. 1 and 2.

The shaft 203, at a position to the outside of the gear 202 thereon, has a V-belt pulley 211 (Figs. 1 and 8) for driving, through a belt 212, a pulley 213 that is rotatably mounted on the shaft 117. The pulley 213 (Figs. 1 and 6) is provided with an eccentric 214 for reciprocally moving a pitman arm 216 the free end of which is pivotally connected at 217 to an arm 218 on the swingable or bumper wall 81 of the corn receiving hopper 78.

It is seen, therefore, that only the operation of the power take off 19 is required to concurrently operate the two picker assemblies 23 and 24 and the wagon elevator 129 which is common to both assemblies, it being understood that the power transmission systems for the assemblies 23 and 24 are similar in construction and operation. The concurrent and uniform adjustment or raising and lowering of the gathering units 26 is readily accomplished by manipulation only of the power lift mechanism 21 in the manner previously described.

Although the invention has been described with respect to a preferred embodiment thereof, it is to be understood that it is not to be so limited and that changes can be made therein which are within the intended scope of the appended claims.

I claim:

1. In combination with a wheeled tractor having a lift mechanism and an axle at the rear end thereof, a corn picker attachment comprising a frame assembly including a first means for supporting a husking unit, second means secured at the front of said first means and inclined forwardly and downwardly therefrom for supporting a gathering unit, third means mounted on the front of said tractor including a vertically movable device secured to said frame assembly, fourth means supported in a stationary manner on said rear axle and pivotally connected to said first means, and means operatively connected between said lift mechanism and said device for imparting movement thereto, whereby said first and second means are pivotally movable as a unit in a substantially vertical plane.

2. In combination with a wheeled tractor having a lift mechanism and an axle at the rear end thereof, a corn picker attachment comprising a frame assembly having first means for supporting a husking unit, said first means including a pair of horizontally disposed, transversely spaced members extended longitudinally along one side of said tractor, second means including a second pair of transversely spaced members secured at the front of said first pair of members and inclined forwardly and downwardly therefrom for supporting a gathering unit, third means mounted on the front of said tractor including a vertically movable device secured to said frame, fourth means including a bracket supported in a stationary manner on said rear axle, the rear ends of said first pair of members being pivotally connected to said bracket, and means operatively connected between said lift mechanism and said device for imparting movement thereto, whereby said first and second means are pivotally movable as a unit in a substantially vertical plane.

3. In combination with a wheeled tractor having a lift mechanism and an axle at the rear end thereof, a corn picker attachment comprising a frame assembly having first means for supporting a husking unit, said first means including a pair of transversely spaced, horizontally disposed members extended longitudinally along one side of said tractor, second means including a second pair of transversely spaced members secured to the front of said first pair of members and inclined forwardly and downwardly therefrom for supporting a gathering unit, guide means including a third pair of transversely spaced members secured to the front of said tractor, a substantially vertically disposed member supported for movement through said guide means and secured to said frame assembly, mounting means secured to said rear axle and extended rearwardly therefrom, a bracket secured to said mounting means in an upstanding manner, the rear ends of said first pair of members being pivotally connected to said bracket, and means operatively connected between said lift mechanism and said vertically disposed member for imparting movement thereto, whereby said first and second means are pivotally movable as a unit in a substantially vertical plane.

4. In combination with a tractor having power operated lift arms projected rearwardly therefrom, a corn picker attachment comprising a main frame including an elongated first section extended longitudinally of said tractor along one side thereof and rearwardly of the rear axle of said tractor, a second section extended downwardly and forwardly from the front end of said first section so as to project forwardly of said tractor, means pivotally supporting the rear end of said first section on said tractor, and means for pivotally raising and lowering said main frame including a pulley member rotatably supported to said main frame substantially vertically under a lift arm, a second pulley member rotatably supported on the front end of said tractor in substantial horizontal and longitudinal alignment with said first pulley member, and a third pulley member rotatably supported to said tractor substantially vertically above said second pulley member, guide means secured to the front of said tractor, an arm member secured to said main frame and vertically movable within said guide means, and a cable device secured at one end to said lift arm, trained beneath said first pulley member to said second pulley member and then over said third pulley member to the lower end of said arm member for attachment thereto.

References Cited in the file of this patent

UNITED STATES PATENTS

| | | |
|---|---|---|
| 2,255,168 | Hyman et al. | Sept. 9, 1941 |
| 2,388,411 | Hicks | Nov. 6, 1945 |
| 2,651,158 | Richardson | Sept. 8, 1953 |
| 2,708,935 | Bauer | May 24, 1955 |